United States Patent
Priggemeyer et al.

(10) Patent No.: US 6,248,233 B1
(45) Date of Patent: Jun. 19, 2001

(54) ARRANGEMENT FOR REMOVING HEAVY METAL IONS FROM ROOF RUNOFF WATERS

(75) Inventors: Sonja Priggemeyer; Stefan Priggemeyer, both of Wallenhorst; Werner Harnischmacher, Osnabrück; Herbert Runde, Greven; Gerhard Weil, Osnabrück, all of (DE)

(73) Assignee: KM Europa Metal AG, Osnabruck (DE)

( * ) Notice: Subject to any disclaimer, the term of this patent is extended or adjusted under 35 U.S.C. 154(b) by 0 days.

(21) Appl. No.: 09/468,426

(22) Filed: Dec. 21, 1999

(30) Foreign Application Priority Data

Dec. 22, 1998 (DE) .............................. 198 59 386

(51) Int. Cl.[7] .......................... B01D 24/22; B01D 35/02
(52) U.S. Cl. .................... 210/162; 210/154; 210/163; 210/170; 210/289; 52/12
(58) Field of Search .................... 210/153, 154, 210/162, 163, 170, 287, 280; 405/36, 52; 52/12

(56) References Cited

U.S. PATENT DOCUMENTS

| | | | |
|---|---|---|---|
| 543,922 | * 8/1895 | Buckley . | |
| 1,532,013 | * 3/1925 | Winans . | |
| 2,013,761 | * 9/1935 | Murphy | 210/162 |
| 2,494,780 | * 1/1950 | Schmidt | 210/162 |
| 3,204,770 | * 9/1965 | Brink | 210/287 |
| 4,472,274 | * 9/1984 | Williams | 210/163 |
| 4,801,377 | * 1/1989 | Bolt | 210/162 |
| 5,114,594 | * 5/1992 | Rosebrock et al. | 210/154 |
| 5,223,154 | * 6/1993 | McPherson, Jr. et al. | 210/163 |
| 5,406,966 | * 4/1995 | Lepowski et al. | 210/162 |
| 5,549,822 | * 8/1996 | Ferguson | 210/287 |
| 5,632,889 | * 5/1997 | Tharp | 210/170 |
| 5,637,211 | * 6/1997 | Neff | 210/170 |
| 5,707,527 | * 1/1998 | Knutson et al. | 210/170 |
| 5,788,849 | * 8/1998 | Hutter, Jr. et al. | 210/170 |
| 5,820,762 | * 10/1998 | Bamer et al. | 210/163 |
| 6,106,707 | * 8/2000 | Morris et al. | 210/163 |

\* cited by examiner

Primary Examiner—Christopher Upton
(74) Attorney, Agent, or Firm—Kenyon & Kenyon

(57) ABSTRACT

An ion removal arrangement includes a filter having a filter material made of synthetic or naturally occurring crystalline hydrated aluminum silicates having a framework structure, which contain alkaline or alkaline earth ions. The filter is formed as a double pipe cartridge having an inner pipe and an outer pipe. The filter material is filled in the annular space between the inner pipe and the outer pipe. The filter is installed in the cast iron gutter pipe of a gutter system.

5 Claims, 2 Drawing Sheets

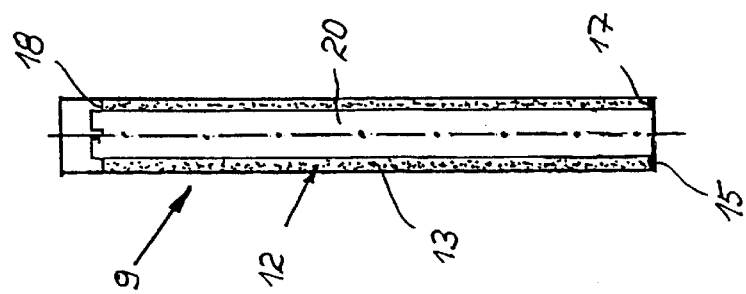
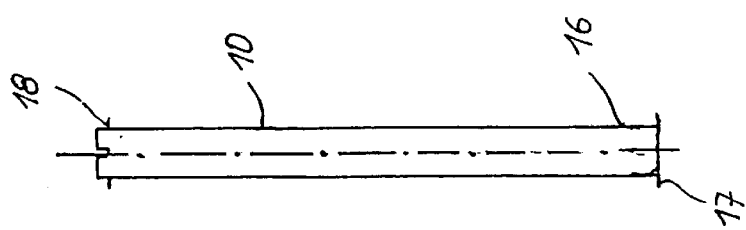
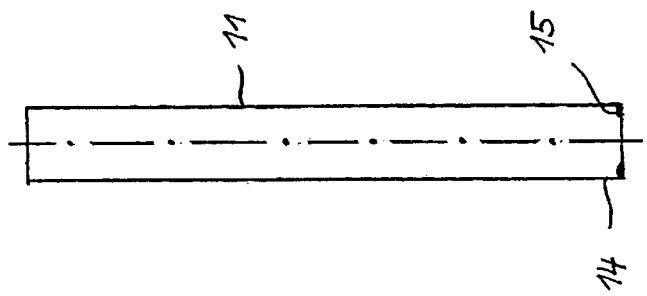
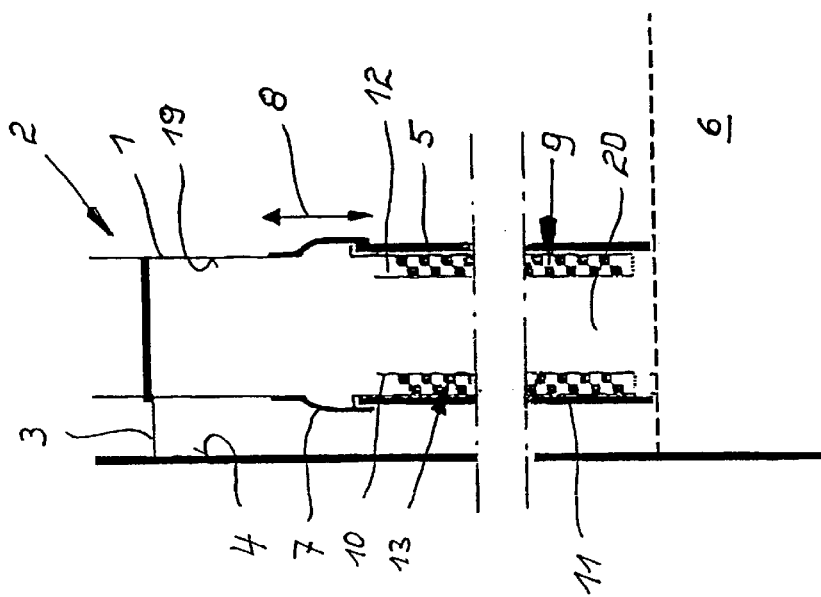

ARRANGEMENT FOR REMOVING HEAVY METAL IONS FROM ROOF RUNOFF WATERS

BACKGROUND OF THE INVENTION

As a result of increased environmental awareness and the trend toward conserving natural water resources, the rainwater running off a roof is usually no longer conducted to a water treatment plant via the sewerage system, but rather increasingly is collected. It is then often used for watering gardens or filling ponds or used in the household as utility water, for example, for flushing toilets.

Usually rainwater is collected as roof runoff water. It contains, in addition to heavy metal dust from the atmosphere, dust accumulated on the roof surfaces coming from the environment or from the roofing materials.

It is known that metallic materials, such as zinc, lead, or copper, which are used as roofing materials or in the construction of gutters, are subject to corrosion due to the effect of air and rain. The amount of metal ions released into the roof runoff water as a result depends on different factors, which include the intensity and amount of the respective precipitation. For this very reason, the environmental friendliness of metallic roofing materials is presently the subject of much critical discussion.

In those cases where roof runoff water is not collected, it is conducted directly to water treatment plants via the sewerage system. Roof runoff water is, however, increasingly drained away directly, so that release of heavy metals into the environment cannot be avoided. Minimizing the release of heavy metals into the soil or natural waters would therefore reduce environmental pollution and reduce the metal content in the sludges produced in water treatment plants. Minimized heavy metal release allow roof runoff water to be used for different applications. Thus, for example, the usage of drinking water, treated at a high cost, for different purposes in the house and garden could be substantially reduced.

It is known that neutralizing systems can be installed at water treatment plants to precipitate heavy metals. This can, however, only be done centrally due to the size of such systems. These are expensive systems to build. In addition, they cannot capture roof runoff water.

Progressing from the related art, the object of the present invention is to provide an arrangement for removing heavy metal ions from roof runoff waters that can be easily and relatively inexpensively installed directly on the building either in new or existing structures.

SUMMARY OF THE INVENTION

The present invention provides an apparatus for removing heavy metal ions from roof runoff waters. A filter having a filter material made of synthetic or natural crystalline hydrated aluminum silicates and having a skeleton structure containing alkaline or alkaline earth ions is used according to the present invention. Such a filter is arranged immediately downstream from a gutter system. The advantage of such a filter material is that it is easy to handle, inexpensive, regeneratable, and hygienically non-objectionable. The roof runoff water thus purified can be used for different purposes in the household, garden, or pond without causing considerable environmental pollution. The invention also makes it possible to easily drain off roof runoff water into the soil or into natural waters.

The filter material can be regenerated and reused in filters via repeated ion exchange. Thus ion exchange costs are kept low and natural resources are saved. Furthermore, chemically bound heavy metals can be recovered so that they can be reused with only negligible amounts of waste being generated.

The filter material is preferably formed by compounds of the zeolite group. However, other materials with ion exchange properties can also be used. Natural zeolite include, for example, chabasite, mordenite, heulandite, clinoptilolite, laumontite, natrolite, analcim, philipsite, and/ or also clays such as bentonite. One zeolith alone or different zeoliths can be used as mixtures. Depending on the size of the surface exposed to precipitation, the type of roof metal (zinc, copper, or lead) and the metal content of the roofing material or gutter, the amounts of filter material ./naturally vary.

According to a further aspect of the invention, it can be of advantage if absorbing means are added to the filter material. These may include, for example, activated carbon, iron oxide, or dolomite. Clinoptilolith or mixtures of clinoptilolith and other zeoliths are preferably used.

According to a further aspect of the invention, an arrangement is provided that is particularly well suited for surfaces exposed to precipitation measuring less than about 160 sq.m. This size corresponds to the DN 100 downpipe normally used in these cases. The filter is designed as a double-pipe cartridge with an inner pipe and an outer pipe with a filter material filled in the annular space between the inner pipe and the outer pipe. It is attached to the cast iron gutter pipe located above the ground surface of a gutter system so that it can be replaced. The cast iron gutter pipe normally terminates a DN 100 downpipe at the ground surface. Since the cast iron gutter pipe is usually coupled to the downpipe via a sliding cast iron gutter pipe cap, the cast iron gutter pipe can be turned after sliding the cast iron gutter pipe cap upward and the filter can then be easily changed.

In the event of a normal rainfall, the roof runoff water flows along the inside of the downpipe and reaches the annular space filled with filter material between the inner pipe and the outer pipe. The flow rate can be selected so the amount of normal rainfall is collected without problems. In the event of heavy rainfall, the excess water can be easily drained off via the inner pipe. Internal research has shown that such roof runoff water only contains low metal concentrations in such cases, which can be drained off unfiltered without objections. The inner pipe also allows leaves and sticks to be easily removed through the inner pipe to the sewerage system in the event of heavy rainfall.

One advantageous property of the filter material is that it can run dry after a rain event. Drying out of the filter has no effect on the separating performance or metal absorption by the filter material. Rather, drying out of the filter has a certain advantage concerning potential clogging of the filter by dirt particles in the roof runoff water. The fact that such dirt particles are being continuously dried out and thus their consistency is being changed, reduces the risk of clogging.

The dimensions of the filter and thus its capacity depend on the outer diameter of the cast iron gutter pipe and on the inner diameter of the inner pipe. In order to reliably prevent clogging by leaves and sticks, the inner diameter of the inner pipe must be at least 30 mm. A maximum inner diameter of 100 mm is adequate. Due to the usual distance of the downpipe to the adjacent building wall and from the esthetic point of view, the outer diameter of the cast iron gutter pipe can be between approximately 100 mm and 250 mm. The height of the filter is between approximately 300 mm and 1800 mm. Within these extremes, the size of the filter is adapted to the conditions of the application, in particular to the surface exposed to rainfall.

The filter is preferably designed such that the lower end of the outer pipe is crimped inward. Thus it forms a stop for the inner pipe that is crimped outward at the lower end. The radial dimension of the annular space between the inner pipe and the outer pipe is also determined by a spacer, which is provided at the upper end of the inner pipe. This spacer can be formed by an annular disk, for example, which is attached to the external perimeter of the inner pipe. Such a filter is easy to manufacture and replace.

Another arrangement is provided that is preferably used if the surface exposed to precipitation is greater than approximately 160 sq.m. and if the roofing material is mainly made of metal. The collector well is usually at the end of the gutter system below ground surface and has a removable cover. A filter is usually installed in such a collector well so that a compact filter material column is present. This column is arranged at a distance from the inside of the collector well at least in some areas so that this distance is used for overflow. Due to the compact column, this filter is capable of filtering large amounts of roof runoff water. Distance specifications or esthetic considerations do not need to be taken into account, since the collector well has sufficient volume to accommodate the necessary amount of filter material. By modifying the filter cross section surface, it can be adapted to the local metal load and the surface area exposed to precipitation over a broad range.

The cover of the collector well allows the filter material to be regularly monitored and replaced as needed.

The height of the compact column in the collector well can be between 200 mm and 1000 mm. The diameter of the column is between 100 mm and 600 mm.

In order for the roof runoff water supplied to the filter to be distributed over the entire cross section of the compact filter column as evenly as possible, a water distributor is arranged above the filter. This can be a distributor spiral, for example. This prevents roof runoff water from dripping only on a certain area of the filter, which is then rapidly saturated and the filtering performance of the filter drops, although its total capacity is far from being exhausted.

Due to the compact design of the filter, there is the danger that dirt and leaves will accumulate on the surface of the filter material and thus clog it. To avoid this problem, a foreign body passage is provided in the lower portion of the gutter system. This foreign body passage can be arranged either directly in the downpipe of the gutter system or directly at the inlet of the collector well.

In cases where a rainwater use system is available or at least planned, it is advantageous if the filter is arranged in a container and located downstream from a water storage device located at the lower end of the gutter system with a pump connected between them. Such a water storage device has a capacity of approximately 1500 liters. The roof runoff water goes from the gutter system into the water storage device and is pumped therefrom by the pump into a container equipped with filter material, wherefrom it can be supplied to one or several consumers.

According to a further aspect of the invention, the filter material is filled into a pressure vessel. The compact filter material is located in a column at mid-height of the pressure vessel. The roof runoff water is fed under pressure from the water storage device above the filter material, flows through the filter material and reaches, at the bottom of the filter material, the discharge pipe that traverses the filter material, wherefrom it can be supplied to a consumer.

It is useful to equip the water storage device with a level control in order to protect the pump from running dry.

According to a further aspect of the invention, a foreign body trap is provided upstream from the water storage device, preferably in the downpipe of the gutter system. This trap separates large particles such as leaves, sticks, and dirt, and the roof runoff water thus pre-cleaned is then conducted into the water storage device. Dirty water in an amount of about 10% of the roof runoff water can be drained into the sewerage system without any problem, without causing any relevant environmental pollution.

The overflow ensures that no storage problems occur even in the event of large amounts of roof runoff water.

According to another aspect of the invention, a suction basket with a suction hose coupled to the pump is provided in the water storage device. This arrangement additionally ensures that no large dirt particles reach the filter material via the pump, causing it to clog.

BRIEF DESCRIPTION OF THE DRAWINGS

The invention is explained in detail below with reference to the embodiments illustrated in the drawings.

FIG. 1 schematically shows a vertical section through an arrangement for removing heavy metal ions from roof runoff water;

FIG. 2 schematically shows a vertical section through an outer pipe for a filter of the arrangement;

FIG. 3 schematically shows a vertical section through the inner pipe of the filter of the arrangement;

FIG. 4 schematically shows a vertical section through the built-in filter of the arrangement;

DETAILED DESCRIPTION OF THE INVENTION

Figure 5:
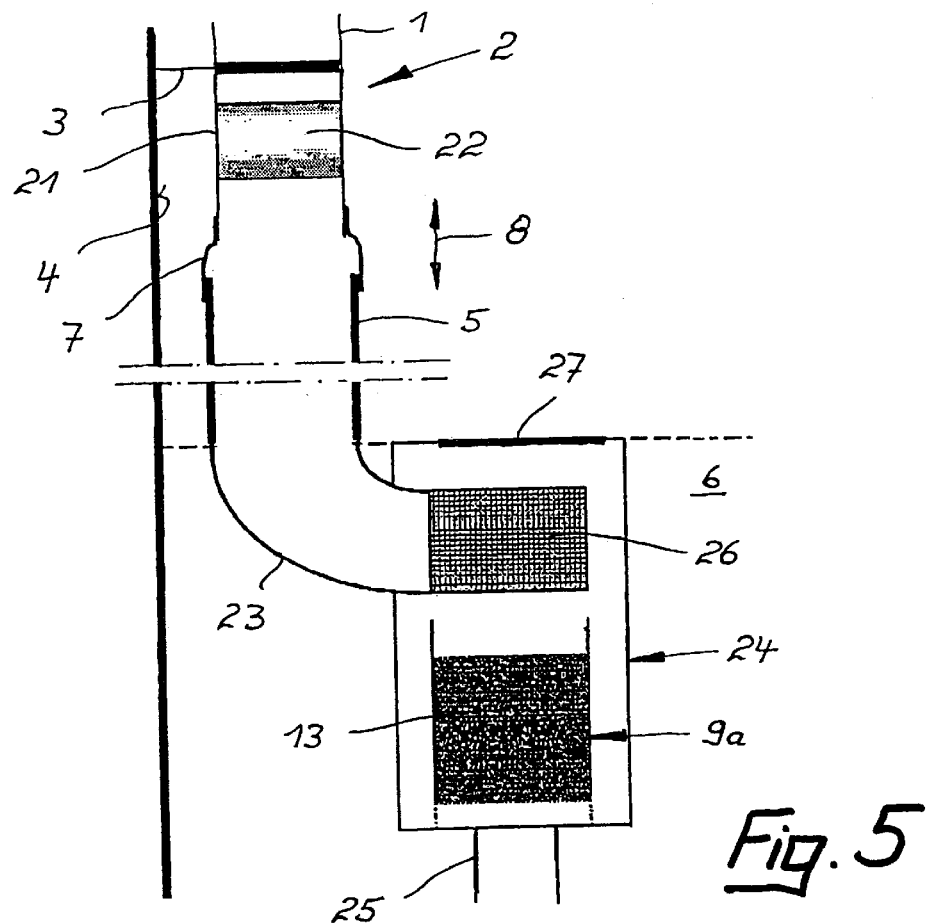
FIG. 5 schematically shows a vertical section through another embodiment of an arrangement for removing heavy metal ions from roof runoff water.

In FIG. 1, the downpipe of a gutter system 2 is denoted as 1. Downpipe 1 is attached using a bracket 3 at a distance from the building wall 4.

The lower end of gutter system 2 is formed by a cast iron gutter pipe 5, which extends above the ground surface 6. Downpipe 1 and cast iron gutter pipe 5 are coupled via a cast iron gutter pipe coupling 7, which can be displaced vertically according to arrow 8.

A filter 9, illustrated in more detail in FIGS. 2 through 4, for removing heavy metal ions from roof runoff waters is installed in cast iron gutter pipe 5. Filter 9 is configured as a double-pipe cartridge having inner pipe 10 and outer pipe 11, as well as filter material 13, filled into annular space 12 between inner pipe 10 and outer pipe 11. In this embodiment, filter material 13 is made of natural zeolite. As can be seen in FIG. 2, outer pipe 11 is crimped inward at its bottom end 14. This forms an annular bottom 15. According to FIG. 3, inner pipe 10 is crimped outward at its lower end 16, thus forming outer annular flange 17. If inner pipe 10 is inserted into outer pipe 11 as FIG. 4 shows, inner pipe 10 is supported by outer pipe 11 and secured at the lower end 16 of annular space 12. In order to secure annular space 12 at the upper end of inner tube 10, a spacer 18 in the form of a collar is provided.

According to FIG. 4, filter 9 is completely inserted in cast iron gutter pipe 5; for this purpose, only cast iron gutter pipe cap 7 must be pushed upward and cast iron gutter pipe 5 must be swivelled away from building wall 4.

In the event of normal rainfall or sleet, the roof runoff water flows on the inside 19 of downpipe 1 and reaches the annular area of filter material 13. If there are larger amounts of precipitation, they can be drained off via inner space 20 of filter 9.

In the embodiment of FIGS. 1 through 4, a typical roof with about 100 sq.m. surface exposed to precipitation and a metallic portion of approximately 10% of this surface is assumed. In this case, the filter material can be used for approximately four years for a 100 mm diameter downpipe 1 and an outer diameter of filter 9 measuring 150 mm, as well as a height of 1000 mm and approximately 7 kg of filter material 13.

The arrangement illustrated in FIG. 5 for removing heavy metal ions from roof runoff waters is used for filtering rainwater from metal roofs with a surface exposed to precipitation greater than 160 sq.m.

Also in this case, downpipe 1 of a gutter system 2 is attached to a building wall 4 using a bracket 3. At the lower end 21 of downpipe 1 there is a foreign body trap 22, in particular for sticks and leaves. Cast iron gutter pipe 5 secured at its lower end above ground surface 6 is also coupled with downpipe 1 via a cast iron gutter pipe cap 7. Cast iron gutter pipe cap 7 can be moved vertically according to arrow 8. An elbow 23 is attached to cast iron gutter pipe 5, which leads to a collector well 24 located under ground surface 6 and is connected to sewerage system 25. A filter 9a in the form of a compact column of filter material 13 is arranged in this collector well 24. A water distributor 26 in the form of a distributor spiral is located above filter material 13.

Collector well 24 has a cover 27, through which filter material 13 can be maintained and regularly changed within the usual periods.

Figure 6:
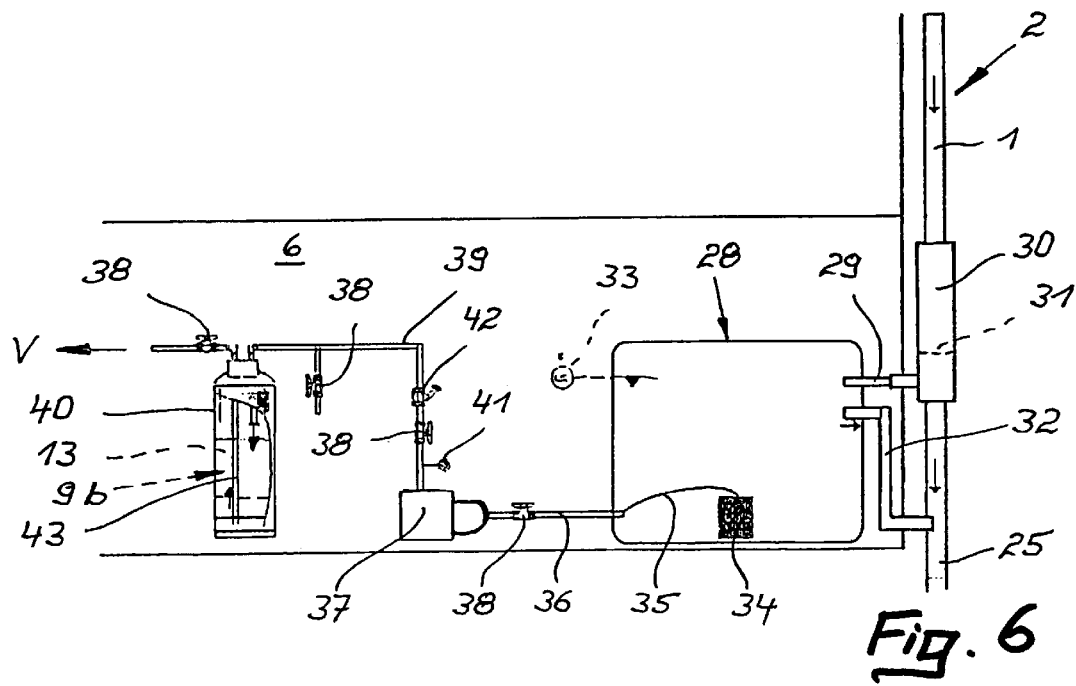
FIG. 6 schematically shows a vertical section through a third embodiment of an arrangement for removing heavy metal ions from roof runoff water.

In the arrangement for removing heavy metal ions from roof runoff waters schematically illustrated in FIG. 6, a water storage device 28 is arranged under ground surface 6. Water storage device 28 is connected to downpipe 1 of a gutter system 2 via inlet 29. A foreign body trap 31 (not illustrated) is arranged in section 30 of downpipe 1 having an increased diameter. Inlet 29 is located in the upper area of water storage device 28. Immediately under it overflow 32 of water storage device 28 is connected to gutter system 2.

In addition, in the upper area of water storage area 28 there is a level control 33.

A suction basket 34, having a suction hose 35 attached, is provided in water storage device 28; suction hose 35 is connected to a pipe 36, which leads to a water pump 37. A shutoff valve 35 is installed in pipe 36. Water pump 37 is connected to a pressure vessel 40 via pipe 39. Shutoff valves 38, pressure gage 41, and a check valve 42 are installed in pipe 39.

A filter 9b, having a column-like compact filter material 13, is located at mid-height of pressure vessel 40. Filter material 13 is also traversed by a discharge pipe 43, which ends under filter 9b. Via this discharge pipe 43, provided with shutoff valve 38, the filtered roof runoff water can be supplied to a consumer V as needed.

REFERENCE SYMBOLS

1 Downpipe of 2
2 Gutter system
3 Bracket
4 Building wall
5 Cast iron gutter pipe
6 Ground surface
7 Cast iron gutter pipe cap
8 Arrow
9 Filter
9a Filter
9b Filter
10 Inner pipe of 9
11 Outer pipe of 9
12 Annular space between 10 and 11
13 Filter material
14 Lower end of 11
15 Bottom of 11
16 Lower end of 10
17 Annular flange on 16
18 Spacer
19 Inside of 1
20 Inner space of 9
21 Lower end of 1
22 Foreign body trap
23 Elbow
24 Collector well
25 Sewerage system
26 Water distributor
27 Cover of 24
28 Water storage device
29 Inlet of 28
30 Section of 1
31 Foreign body trap
32 Overflow of 28
33 Level control
34 Suction basket
35 Suction hose
36 Pipe
37 Water pump
38 Shutoff valve
39 Pipe
40 Pressure vessel
41 Pressure gage
42 Check valve
43 Drain pipe
V Consumer

What is claimed is:

1. A double pipe cartridge filter for removing heavy metal ions from roof runoff waters comprising:

an inner pipe having an upper end and a lower end, said upper and lower ends defining openings, said openings sized so that debris may pass through the inner pipe;

an outer pipe having an upper end and a lower end, said outer pipe adapted to be installed in a cast iron gutter pipe that is located above the ground surface of a gutter system, said upper and lower ends being open;

said inner and outer pipes connected to one another to define an annular space therebetween, said annular space being open at the top and bottom so that water may flow into the annular space at the top and out of the annular space at the bottom; and a filter material filling the annular space between the inner pipe and the outer pipe.

2. The arrangement according to claim 1, wherein the filter material is formed by compounds of the zeolite group.

3. The arrangement according to claim 2, wherein the filter material comprises absorption means.

4. The arrangement according to claim 1, wherein the filter material comprises absorption means.

5. The arrangement according to claim 1 wherein the lower end of the outer pipe is crimped inward and the lower end of the inner pipe is crimped outward, and wherein the arrangement further comprises at least one spacer that determines the width of the annular space and which is provided at the upper end of the inner pipe.

* * * * *